US008316002B2

(12) United States Patent
Lin et al.

(10) Patent No.: US 8,316,002 B2
(45) Date of Patent: Nov. 20, 2012

(54) METHODS, SYSTEMS AND COMPUTER PROGRAM PRODUCTS FOR A MOBILE DATA FEED DISTRIBUTOR

(75) Inventors: Zhijian Lin, Dublin, CA (US); Eliezer K. Pasetes, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 515 days.

(21) Appl. No.: 12/269,217

(22) Filed: Nov. 12, 2008

(65) Prior Publication Data

US 2010/0121831 A1    May 13, 2010

(51) Int. Cl.
*G06F 17/30* (2006.01)
(52) U.S. Cl. ......................... 707/706; 709/223
(58) Field of Classification Search .................. 707/706; 455/552.1; 709/223
See application file for complete search history.

(56) References Cited

U.S. PATENT DOCUMENTS

2008/0250035 A1* 10/2008 Smith et al. .................. 707/100
2009/0061925 A1*  3/2009 Finkelstein et al. ....... 455/552.1

* cited by examiner

*Primary Examiner* — Huawen Peng

(57) ABSTRACT

This disclosure details the implementation of methods, systems and computer program products for a mobile data feed distributor (hereinafter, "Distributor"). Distributor embodiments may serve to facilitate users' selection of data feeds of interest and the provision of data feed data to mobile devices. In one embodiment, the Distributor may acquire and/or validate user preferences with respect to available data feeds, store those preferences, and subsequently direct the provision of data feed updates to a user's mobile device via short message service (SMS) text messages, multimedia messaging service (MMS) picture alerts, and/or the like. User preferences may include selections of data feed sources, designations of update messaging restrictions, and/or the like.

19 Claims, 9 Drawing Sheets

METHODS, SYSTEMS AND COMPUTER PROGRAM PRODUCTS FOR A MOBILE DATA FEED DISTRIBUTOR

BACKGROUND

Data formats called data feeds have come about, allowing users to receive periodically updated information of interest on their computers. Content providers may syndicate content data to make it available to users via a feed link. Users may then incorporate the feed link into a feed aggregator, which collects and displays data feeds from different sources. In this way, users subscribe to various data feeds and, thereafter, can receive and view updates to the associated content data maintained by the respective content providers. Many content providers currently operate data feeds, including news organizations, websites, blogs, schools, and/or the like.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION OF PREFERRED EMBODIMENTS

This disclosure details the implementation of methods, systems and computer program products for a mobile data feed distributor (hereinafter, "Distributor"). Data feeds, such as web feeds, RSS feeds, Atom feeds, and/or the like, are among the most popular means of acquiring news and/or information from the internet, in particular from the world wide web. Data feeds allow users the freedom to select for and distill the content that is most informative and/or interesting for them. Distributor embodiments may serve to facilitate users' selection of data feeds of interest and the provision of data feed data to mobile devices. In one embodiment, the Distributor may acquire and/or validate user preferences with respect to available data feeds, store those preferences, and subsequently direct the provision of data feed updates to a user's mobile device via short message service (SMS) text messages, multimedia messaging service (MMS) picture alerts, and/or the like. A wide variety of mobile devices may be compatible with Distributor services, such as but not limited to mobile telephones, personal digital assistants (PDAs), blackberries, iPhones, iPod Touches, and/or the like. It is to be understood that, depending on the particular needs and/or characteristics of a Distributor user, administrator, content provider, data payload, monetization model, hardware configuration, network framework, and/or the like, various embodiments of the Distributor may be implemented that enable a great deal of flexibility and customization. The instant disclosure discusses embodiments of the Distributor primarily within the context of voluntary RSS feed subscriptions and data display on personal mobile devices. However, it is to be understood that the system described herein may be readily configured/customized for a wide range of other applications or implementations. For example, aspects of the Distributor may be adapted for emergency alert distribution, personal reminders, non-mobile data display platforms, and/or the like applications. It is to be understood that the Distributor may be further adapted to other implementations or data distribution applications.

Figure 1:
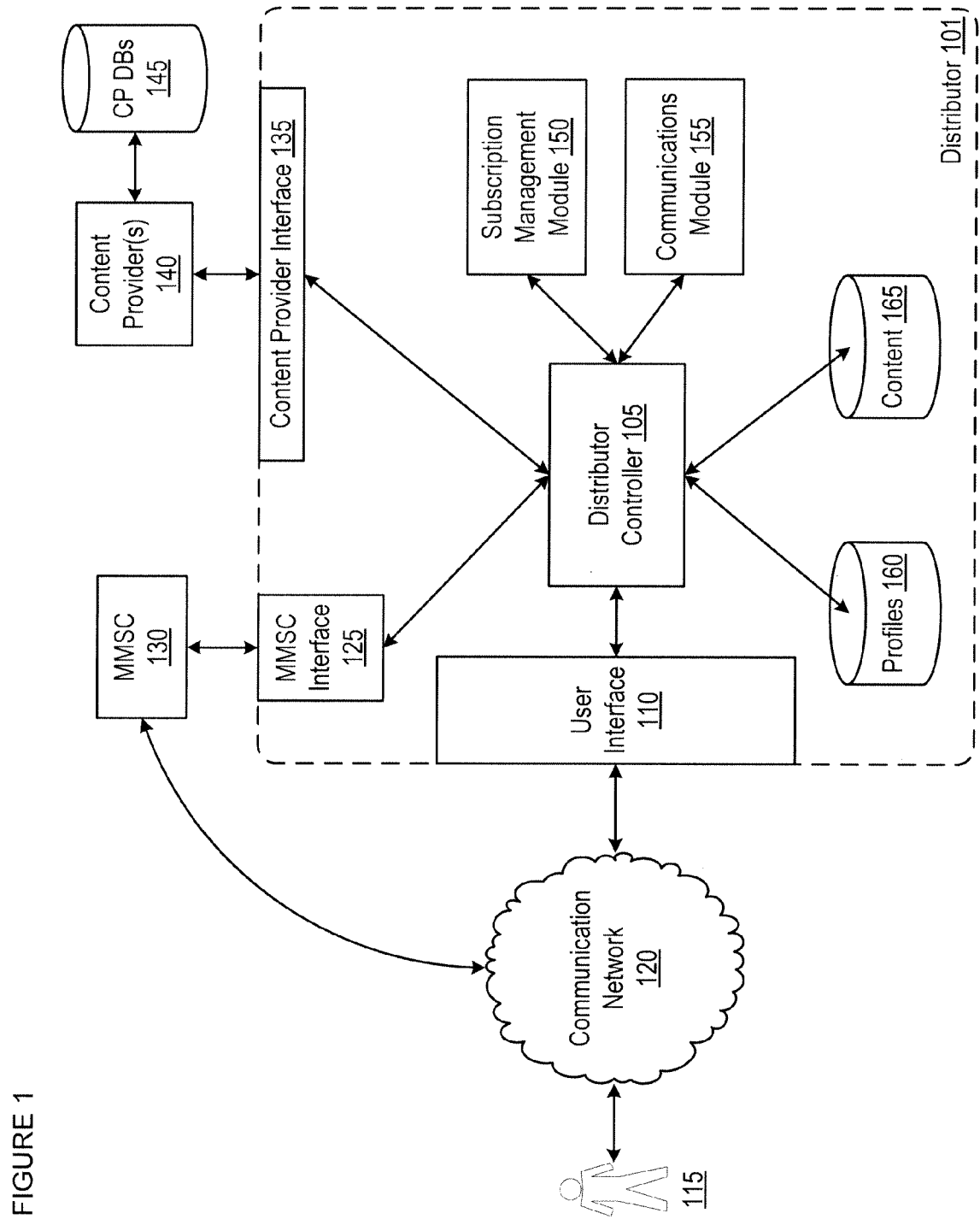
FIG. 1 provides an overview of an implementation of Distributor components and affiliated entities in one embodiment of Distributor operation.

FIG. 1 provides an overview of an implementation of Distributor components and affiliated entities in one embodiment of Distributor operation. The Distributor 101 may contain a number of functional modules and/or data stores. A Distributor controller 105 may serve a central role in some embodiments of Distributor operation, serving to orchestrate the reception, generation, and distribution of data and/or instructions to, from and between Distributor modules and/or mediate communications with external entities and systems. An external user 115, who may be equipped with a communications enabled computing terminal and/or mobile device, may access Distributor services via a communications network 120. A Distributor user interface 110 may be configured to receive user subscription requests, specifications, and/or instructions, relay Distributor messages and/or content provider data, and/or the like.

In one implementation, the Distributor controller 105 may further be coupled to a MMS Center (MMSC) 130, equipped to process received data into one or more MMS messages, picture alerts, and/or the like and to send generated messages to any of a variety of destinations, mobile devices, and/or the like, such as to a user's 115 mobile device via a communications network 120. In an alternative implementation, the Distributor may be coupled to one or more facilities equipped to mediate SMS messages and/or other mobile messaging formats in addition to and/or instead of MMS messages. The Distributor controller may engage, access and/or communicate with the MMSC 130 via an MMSC interface 125, which may serve to configure data provided to the MMSC into one or more formats suitable for MMSC communications and/or processing. In an alternative implementation, an MMSC may be integrated within a Distributor system.

In one implementation, the Distributor controller 105 may further be coupled to one or more content providers 140, who may store, process, update, and/or distribute content data pertaining to a wide variety of different subjects of interest. By way of example only, content providers may comprise news services, blogs, podcasters, schools, emergency services, weather agencies, entertainment broadcasters, and/or the like. A content providers 140 may be communicatively coupled to one or more content provider databases 145 in which content data is stored. The Distributor controller may engage, access, and/or communicate with the content providers 140 via a content provider interface 135, which may serve to configure data received from content providers into one or more formats suitable for Distributor processing and/or storage, and/or for provision to an MMSC 130 for subsequent distribution to users.

In one implementation, the Distributor controller 105 may further be coupled to a plurality of modules configured to implement Distributor functionality and/or services. A subscription management module 150 may, in various implementations, process user subscription settings, requests, preferences, and/or the like; generate and store user profiles, subscription data records, and/or the like; query user profiles to extract subscription information and/or periodically query content providers for data feed updates; and/or the like. A communications module 155 may, in various implementations, configure communications, requests, queries, content provider data, MMSC instructions, user alerts, and/or the like into one or more formats suited to the destination for and/or source of a particular communication.

In one implementation, the Distributor controller 105 may further be coupled to a plurality of databases configured to store and maintain Distributor data. A profiles database 160 may contain user profile information, data feed and/or alert preferences, mobile device specifications, current user subscriptions, past data feed provisions and/or historical subscription records, and/or the like. A content database 175 may contain content provider data configured as raw data, data feed formats and/or mobile device message formats (e.g., SMS text messages, MMS picture alerts, and/or the like).

In one embodiment, the Distributor controller 105 may be housed separately from other modules and/or databases within the Distributor, while in another embodiment, some or all of the other modules and/or databases may be housed within and/or configured as part of the Distributor controller. Further detail regarding implementations of Distributor controller operation, modules, and databases is provided below.

Figure 2:
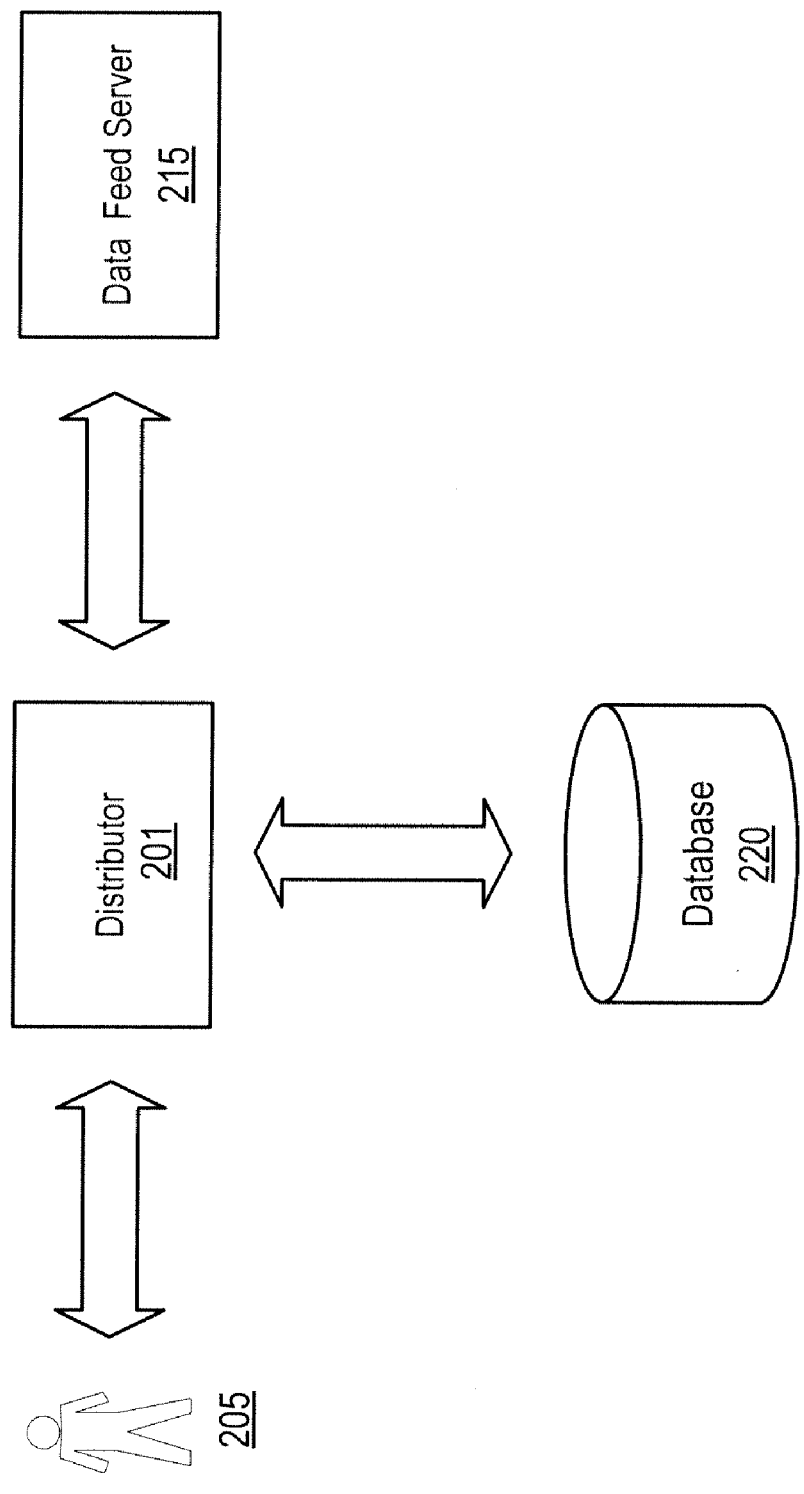
FIG. 2 shows an implementation of data flow for user feed subscription in one embodiment of Distributor operation.

FIG. 2 shows an implementation of data flow for user feed subscription in one embodiment of Distributor operation. The Distributor 201 may be coupled to one or more users 205 who may provide and/or specify data feed information, preferences, settings, and/or the like, such as via a Distributor subscription provisioning page. In one implementation, the provisioning page may comprise a web form. In one implementation, the user may engage the provisioning page via a non-mobile computing terminal. In another implementation, the user may engage the provisioning page via a mobile device web browser. The data feed information provided by the user may comprise a data feed address designation. For example, the data feed may comprise an RSS feed, Atom feed, and/or the like, and the address designation may comprise a universal resource locator corresponding the data feed. The Distributor 201 may send a request to the address designation in order to validate the data feed server 215 and/or otherwise determine that a valid data feed is associated thereto. If the Distributor 201 determines that the data feed information provided by the user corresponds to a valid data feed, then the Distributor may store and/or update the user's subscription information, comprising data feed information, preferences, settings, and/or the like, in a database 220, such as a profiles database.

Figure 3:
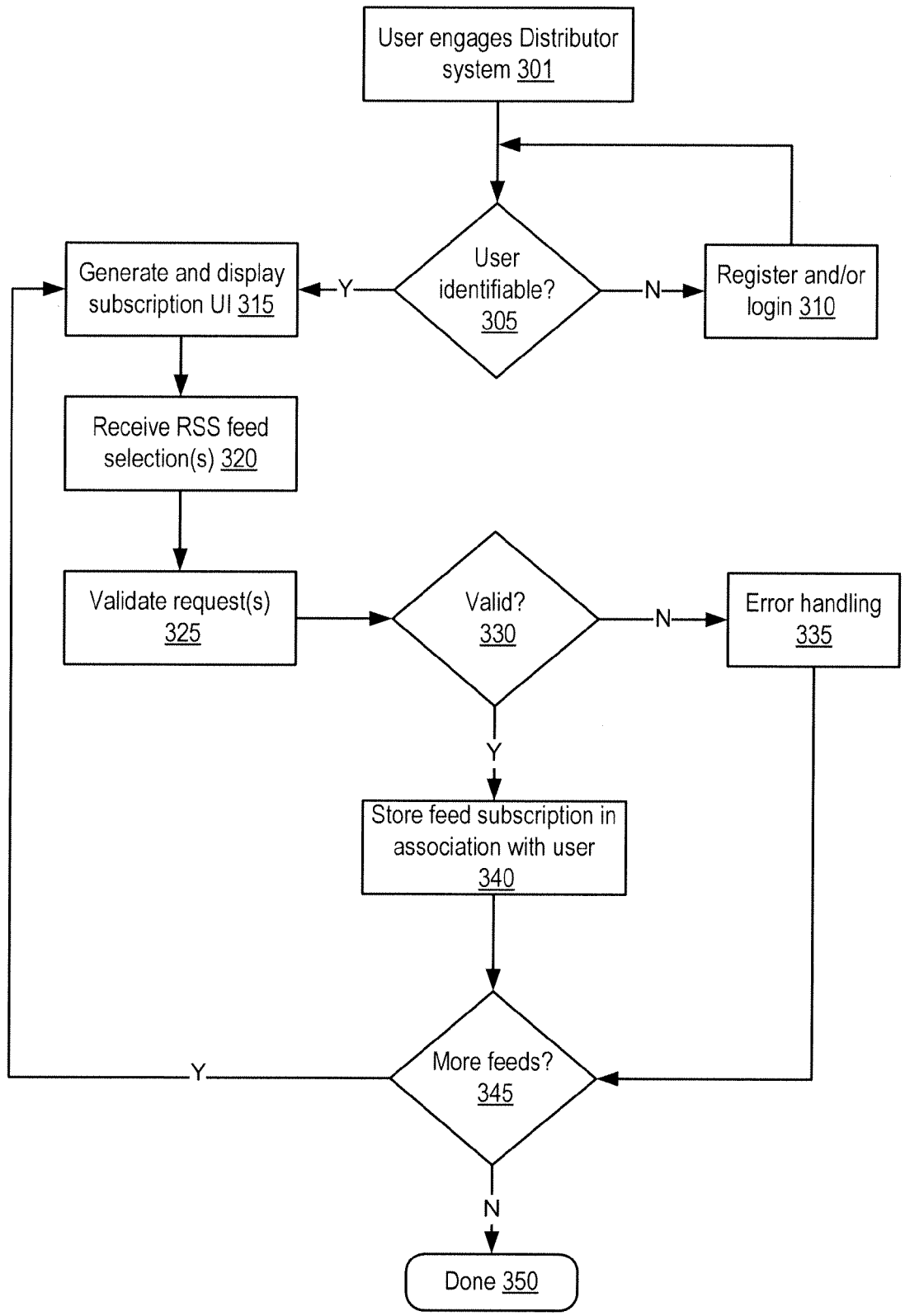
FIG. 3 shows an implementation of logic flow for user feed subscription in one embodiment of Distributor operation.

FIG. 3 shows an implementation of logic flow for user feed subscription in one embodiment of Distributor operation. A user may engage a distributor system at 301, such as via a non-mobile computing terminal coupled to a communications network. In another implementation, the user may engage a Distributor system via a mobile device coupled to a communications network (e.g., via a mobile device web browser). A determination may be made at 305 as to whether the user is identifiable (e.g., whether the user is registered, has logged in, whether the user's mobile device has provided a user identifier, and/or the like). If not, then the user may be requested to register and/or log in 310 before allowing him or her to proceed with engaging other Distributor services and/or functionality. Once the Distributor is able to identify the user, a user interface (UI) comprising a subscription provisioning page may be generated and displayed 315. In one implementation, the subscription provisioning page may comprise a web form, such as may contain fillable text boxes, selectable links, and/or any of a variety of other form elements, interface widgets, and/or the like. In one implementation, the web form may comprise a text box configured to receive data feed address designations and/or a list of selectable links corresponding to data feed sources. The Distributor may receive one or more data feed (e.g, RSS feed) selections at 320, the selections comprising at least a data feed address designation. In one implementation, the data feed selections may further comprise messaging and/or alerting restrictions, such as an alert cap (e.g., a maximum number of data feed messages to be sent to the user in a pre-designated period of time), blackout periods (e.g., periods of time during which no data feed updates should be sent to the user's mobile device), and/or the like.

In one implementation, the Distributor may undertake validation of the user's data feed subscription request 325. Validation may, for example, comprise sending a request for data to the data feed address designation (e.g., URL) specified by the user and determining whether a valid data feed corresponds thereto (e.g., by checking whether properly configured data is returned). A determination is made at 330 as to whether or not the user's data feed subscription request is determined to be valid. If not, then an error handling procedure may be undertaken 335. For example, the user may be provided with an error message, a request to check and/or re-enter the subscription request, a listing of system guesses for valid data feeds that are closest to the address designation provided by the user, and/or the like. If, on the other hand, the subscription request is determined to correspond to a valid data feed, then the feed subscription information and/or other information associated with the subscription request may be stored in association with the user, a user identifier, a user profile, and/or the like 340. A determination may then be made as to whether the user desires to enter more feed subscription requests 345. If so, the Distributor returns to 315 to generate and/or display the subscription provisioning form. Otherwise, the user feed subscription flow is done 350.

Figure 4A:
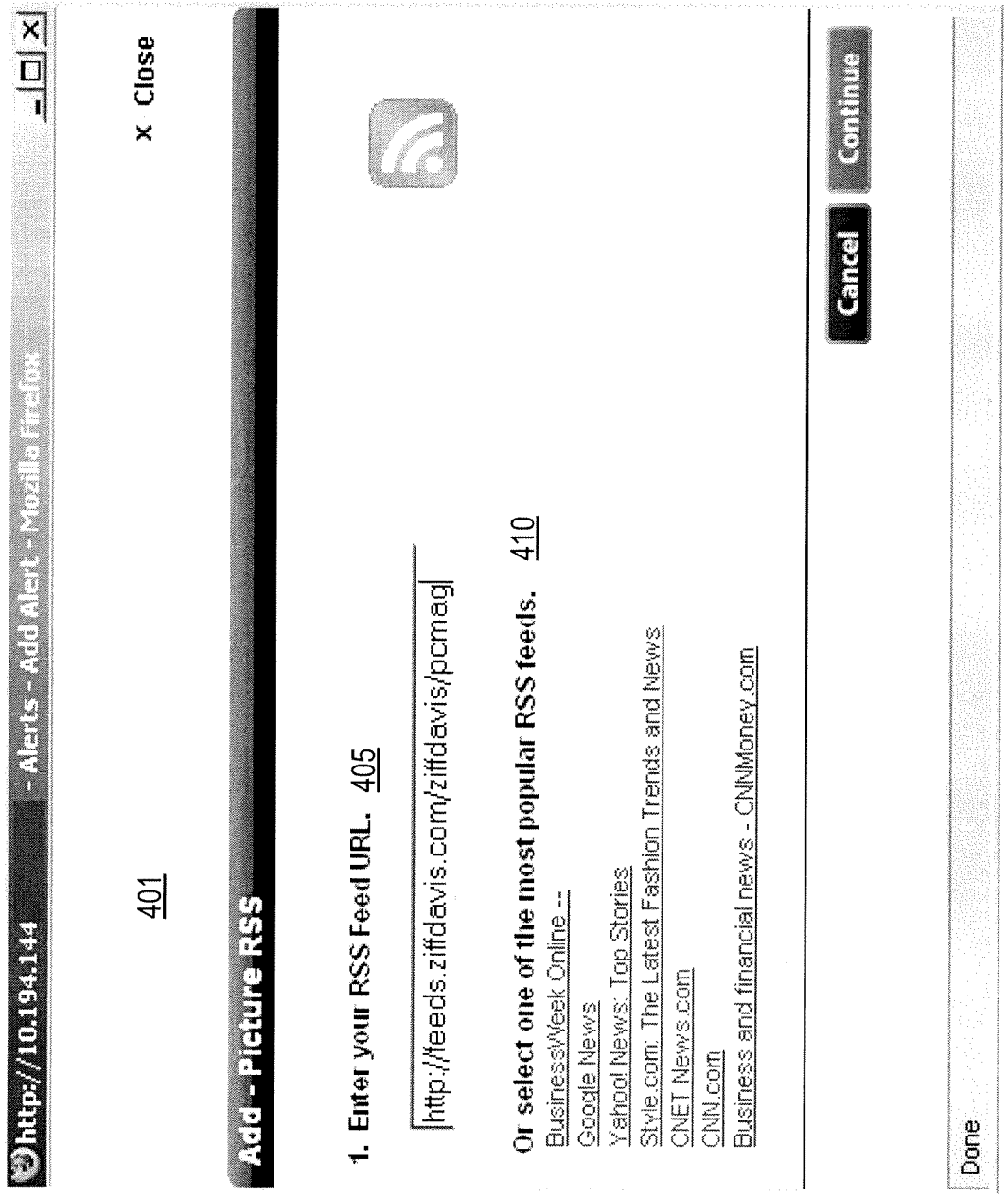
FIGS. 4A-4B show aspects of an implementation of a user interface for user feed subscription in one embodiment of Distributor operation.
Figure 4B:
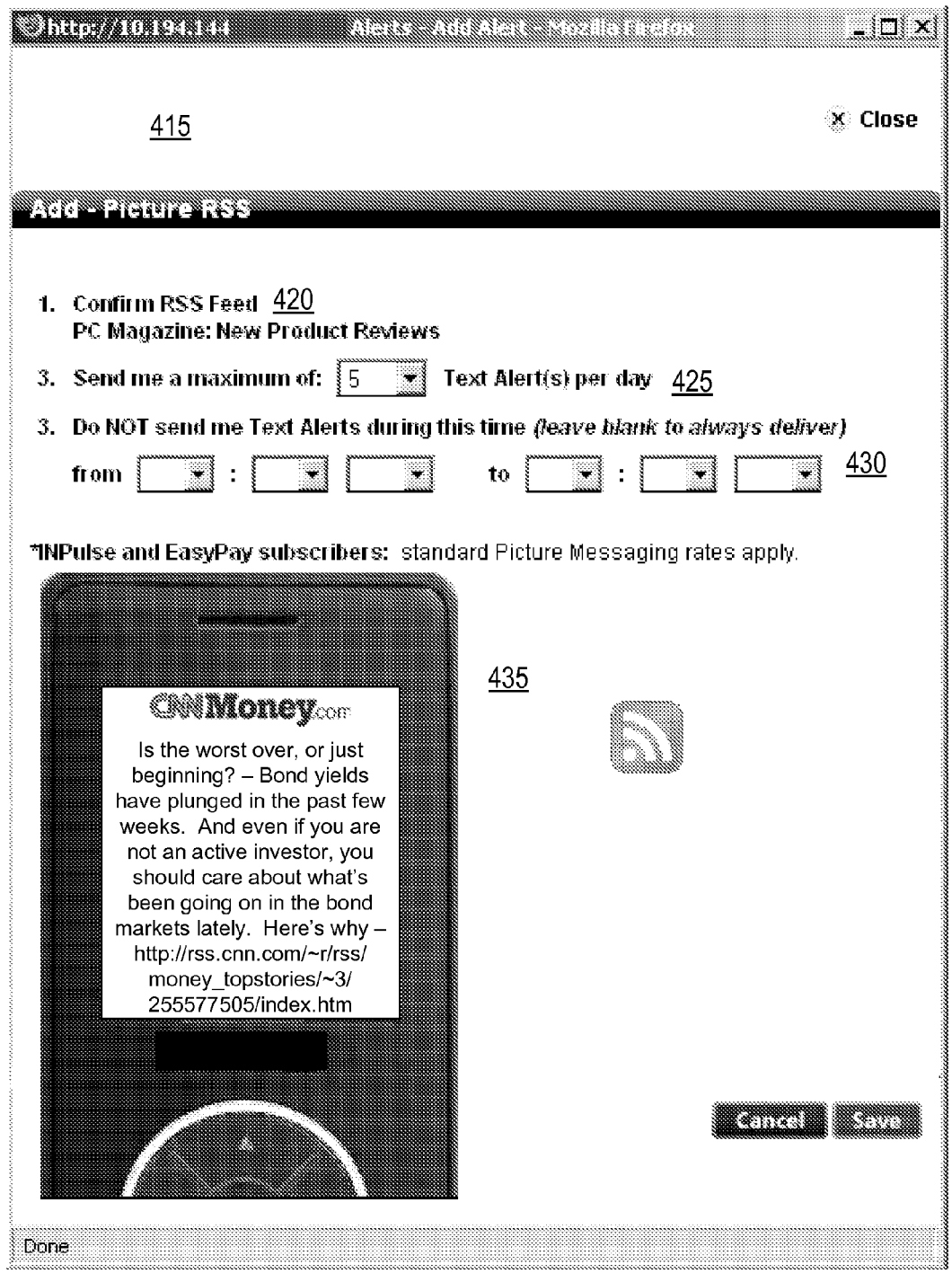

FIGS. 4A-4B show aspects of an implementation of a user interface for user feed subscription in one embodiment of Distributor operation. In FIG. 4A, aspects of a first page 401 of the subscription provisioning page are shown in one implementation. The page includes an area 405 that includes a text box configured to receive RSS feed URLs corresponding to RSS feeds to which the user wishes to subscribe. The page further includes an area 410 listing popular RSS feeds. Each listing in the list of feeds is configured as a selectable link, whereby selection thereof instructs the Distributor to query and/or store an associated URL and/or other data feed address designation. In FIG. 4B, aspects of a second page 415 of the subscription provisioning page are shown in one implementation. The page includes an area displaying one or more selected data feeds 420, in this case displayed by an associated title. In one implementation, the display of selected data feeds may include an interactive widget configured to allow a user to specify whether the displayed data feed source corresponds to the desired data feed. If the user specifies that it does not, the Distributor may return the user to the first page shown at 401 to re-enter data feed information. The page at 415 further includes an area 425 wherein a user may specify a data feed restriction comprising a messaging and/or alert cap. In the displayed implementation, the user is permitted to specify a maximum number of text alerts, corresponding to data feed updates, to be provided to his or her mobile device within a pre-designated period of time (e.g., one day). The page further includes a second area for specifying a data feed restriction 430, in this case a blackout period during which the user does not wish to receive any messages and/or alerts associated with data feed updates. The interface elements for specifying the blackout period in the illustrated implementation comprise pull-down menus for specifying a start and end time for the blackout period, though a variety of other interface elements may be employed in alternative implementations. Finally, the illustrated implementation of the second provisioning page 415 includes a display of an example alert sent to a mobile device 435. In one implementation, the Distributor may query a latest data feed update associated to the data feed selected by the user for subscription (e.g., from the data feed source displayed at 420) and display it in the example at 435. In another implementation, the Distributor may query a user profile and extract a user's mobile device hardware identifier in order to determine what type of mobile device the user has. The Distributor may then retrieve an image associated with that mobile device and use it in the example display shown at 435.

Figure 5:
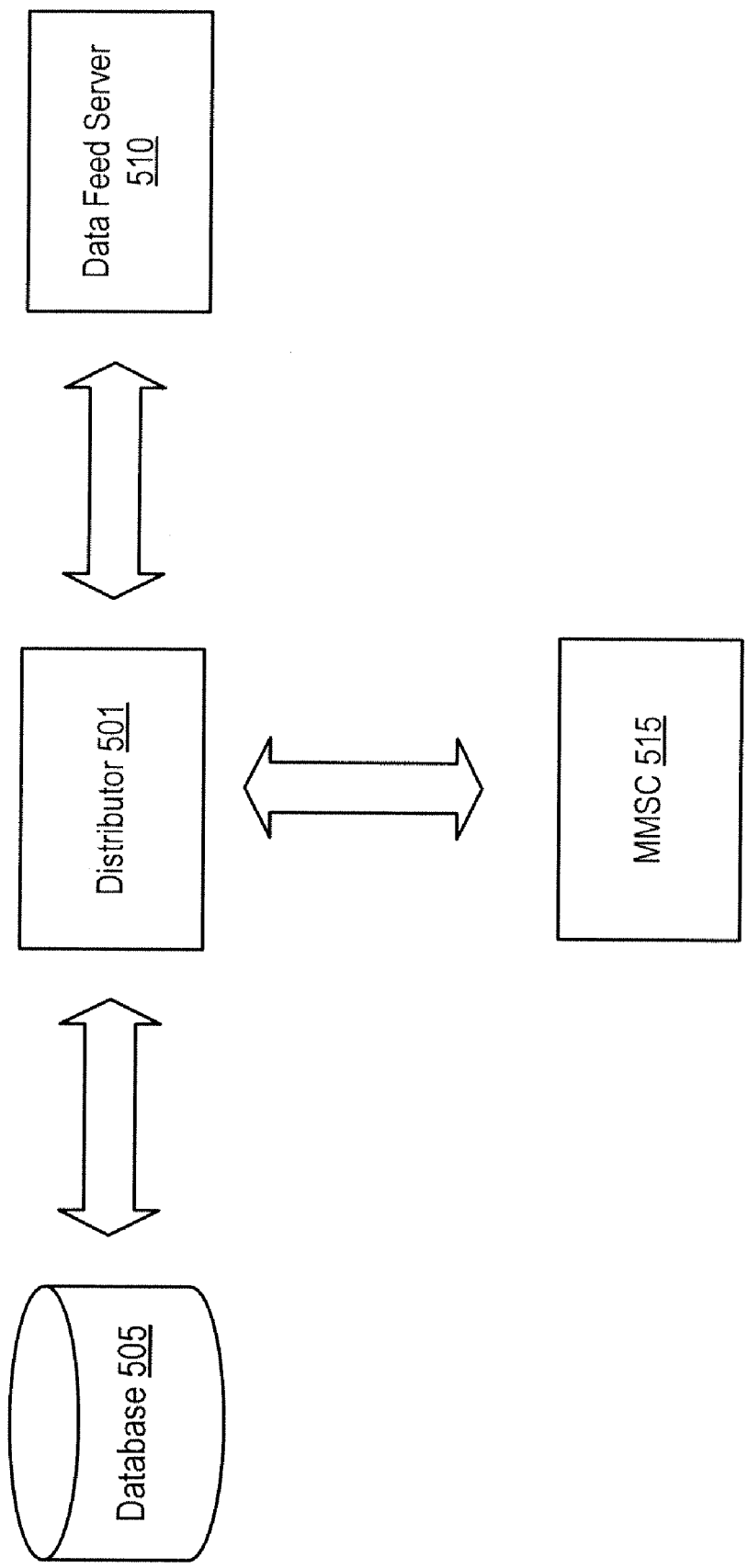
FIG. 5 shows an implementation of data flow for content delivery in one embodiment of Distributor operation.

FIG. 5 shows an implementation of data flow for content delivery in one embodiment of Distributor operation. The Distributor 501 may periodically check data feed sources for data feed updates to provide to users. The Distributor 501 may query a database 505, such as a profiles database, to determine which data feeds and/or data feed sources that one or more users are subscribed to. In one implementation, this query may be performed every time the Distributor is ready to send out updated data feed information to user mobile devices. In another implementation, this query may be performed less frequently, and the subscription information may be kept in temporary and/or intermediate storage between database queries. The Distributor 501 may then communicate with one or more data feed servers and/or sources 510 to retrieve data feed updates 510. A data feed update may, for example, comprise RSS feed items, including a title associated with the data feed content, a description of the data feed content, and/or a link with which a user may retrieve more content associated with the data feed. The data feed update may be configured as a mobile device message, such as an SMS text message, MMS message, and/or the like, to be provided to a user mobile device. In the illustrated implementation, the data feed update information may be provided to an MMSC 515 to be converted to an MMS message, picture alert, and/or the like and/or be subsequently sent to a user mobile device.

Figure 6:
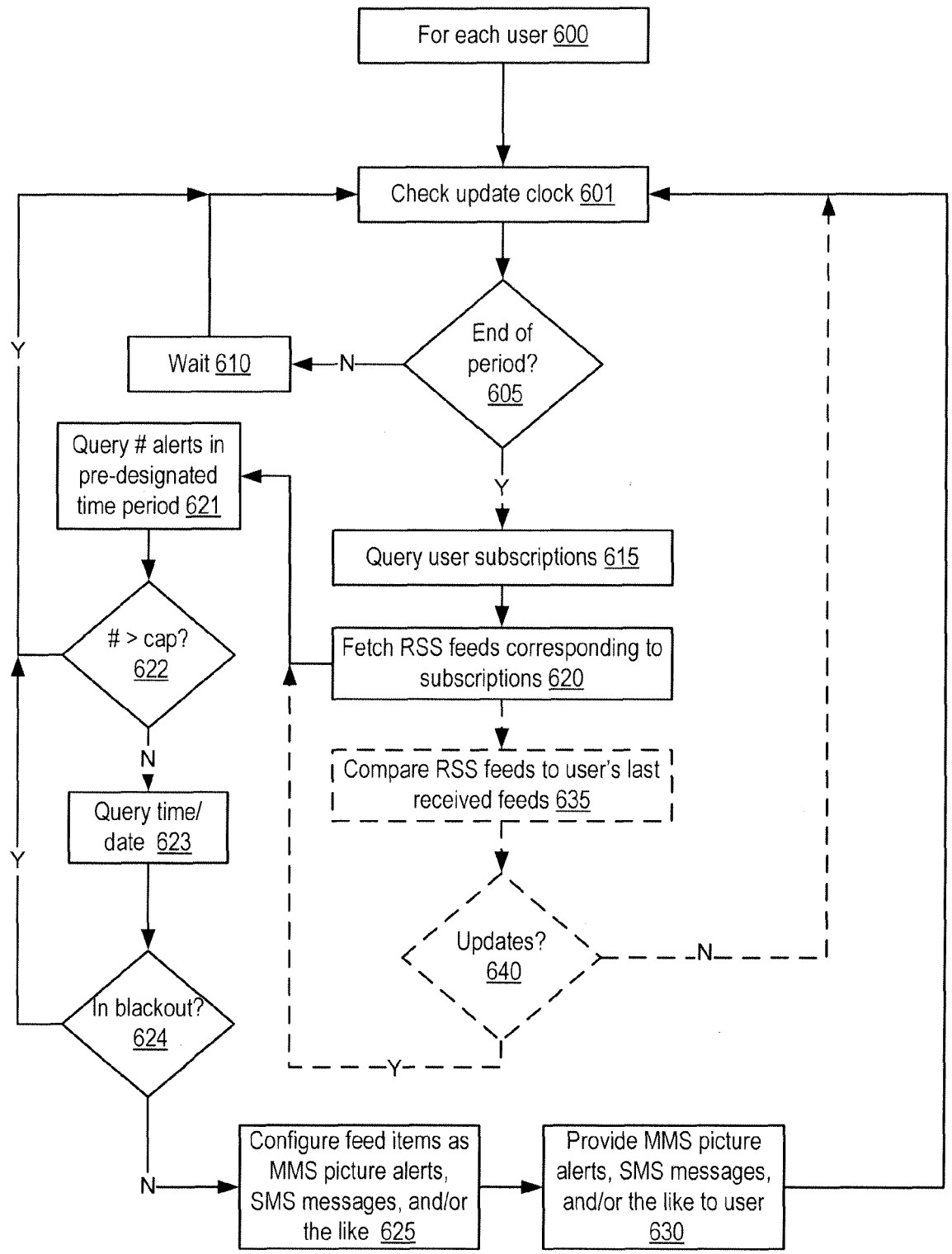
FIG. 6 shows an implementation of logic flow for content delivery in one embodiment of Distributor operation.

FIG. 6 shows an implementation of logic flow for content delivery in one embodiment of Distributor operation. For each Distributor user and/or feed subscriber 600, the Distributor and/or a Distributor component (e.g., a subscription management module) may check an update clock 601 to determine whether or not the end of a period has been reached for updating data feeds 605. In one implementation, a single user or subset group of users may have a different update clock and/or schedule than other users. In another implementation, data feed updates for Distributor users may be subject to the same update schedule and/or clock. If the end of a period has not been reached, the Distributor may wait for a designated period of time 610 before again checking the clock 601. Otherwise, the Distributor may query user subscriptions 615, such as may be stored in a profiles database and/or in an intermediary storage repository, to determine which data feed sources, content providers, and/or the like to query for updates. The Distributor may communicate with the one or more determined data feed sources to fetch data feed (e.g., RSS feed) information corresponding to the queried user subscription information 620. In one implementation, the Distributor may query a record, such as may be stored in association with a user profile, of the number of alerts, messages, data feed updates, and/or the like that have been sent to a user and/or a user mobile device in a pre-designated period of time (e.g., within the same day) 621. A determination may be made as to whether that number exceeds any user-specified cap 622 and, if so, then the update may be bypassed and the Distributor may return to 601. Otherwise, in one implementation, the Distributor may query the current time and/or date 623 in order to determine whether either and/or both fall within a user-designated blackout period during which he or she wishes not to receive any Distributor alerts, messages, data feed updates, and/or the like. If the current time and/or date falls within the blackout period, then the Distributor may return to 601. Otherwise, the Distributor may configure retrieved data feed information, items (e.g., title, description, link, and/or the like), and/or the like as a mobile device message, SMS message, MMS picture alert, and/or the like 625 for distribution to one or more selected users. In one implementation, the Distributor may pass the data feed information along to a third party MMSC to configure and send the data feed information to the user. In another implementation, the MMSC may be integrated as part of the Distributor itself. Once configured, the mobile device message (e.g., MMS picture alert) may be provided to the user and/or a user mobile device, such as via a communications network 630.

In some implementation, a fee may be assessed for Distributor services. For example, in one implementation, a fee may be charged on a per-message basis for each data feed update, message, alert, and/or the like. In another implementation, Distributor messages, updates, alerts, and/or the like may be provided for free, but a fixed, periodically levied fee may be charged for access to Distributor services.

In one implementation, a user may be permitted to force an end-of-period and/or compel the Distributor to check for data feed updates. For example, a user may send an instruction to the Distributor, such as via an SMS text message, instructing the Distributor to immediately check for data feed updates for the data feeds to which the user is subscribed. If the Distributor discerns any updates, they may be configured as mobile device messages and provided to the user and/or a user mobile device.

In one implementation, The Distributor may proceed from 620 to 635 to compare data feed update information to the last data feed update sent to and/or received by a user and/or a user's mobile device. A determination may then be made as to whether there have been updates over and above the data feed information already received by the user 640. For example, a latest data feed item title retrieved from a content provider may be compared to the last data feed item title sent to a user from the same content provider. If there has been no update over the last data feed provided to the user, the Distributor may bypass the update and return to 601. Otherwise, the Distributor may proceed to 621 and/or continue with the provision of Distributor functionality and/or services.

In one implementation, the Distributor may employ a delegate method for data feed updating and/or distribution, whereby one or more content providers are authorized and/or empowered by the Distributor to notify the Distributor if and when any data feed updates have been generated and/or are ready to be provided to the Distributor and/or one or more users, data feed subscribers, and/or the like.

Figure 7:
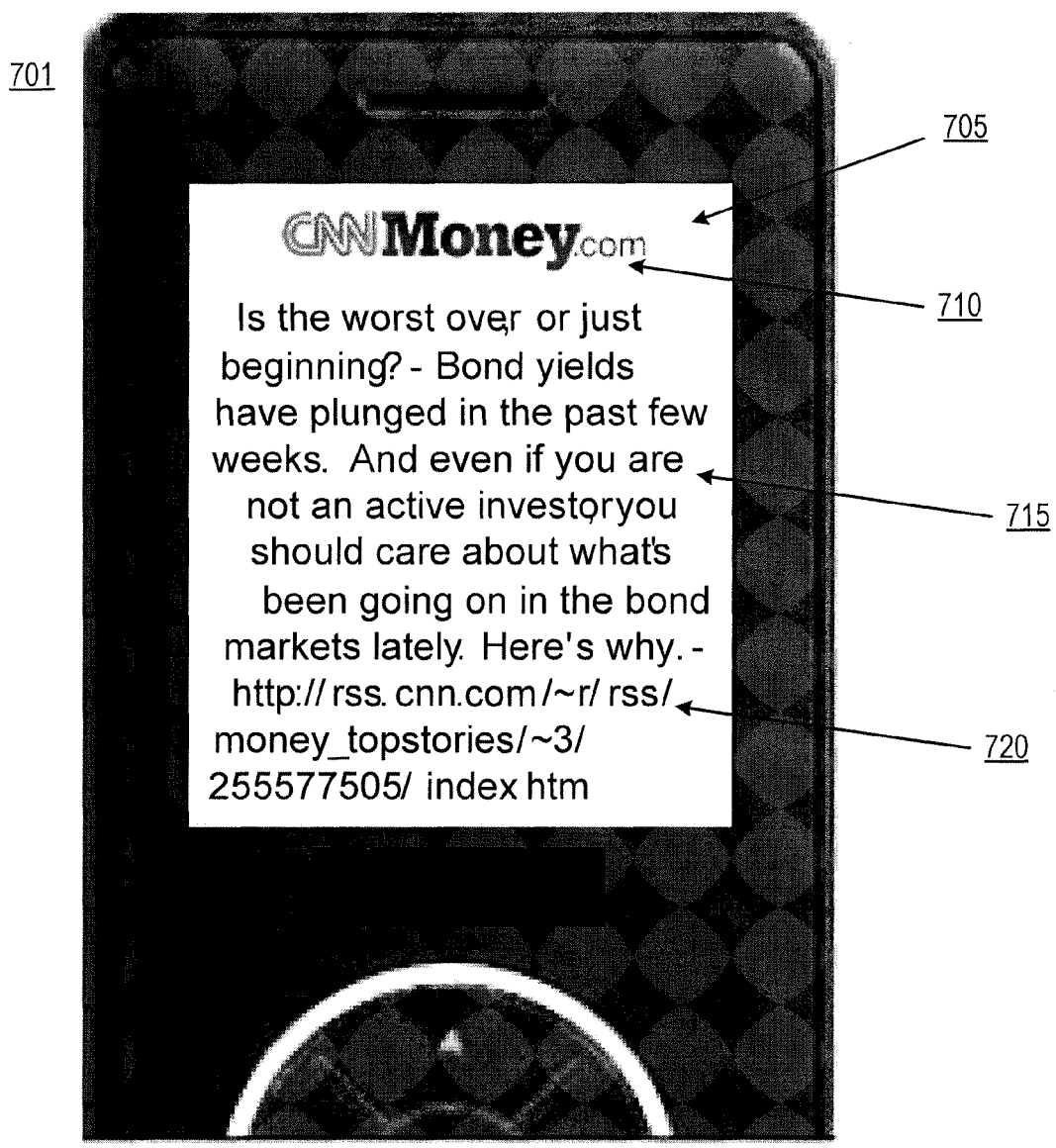
FIG. 7 shows aspects of an implementation of a user interface for content delivery in one embodiment of Distributor operation.

FIG. 7 shows aspects of an implementation of a user interface for content delivery in one embodiment of Distributor operation. A user's mobile device 701 includes a display area which displays a data feed update 705 provided by a Distributor service. The data feed update 705 may include a title 710. In this case, the title 710 comprises a designation of the data feed source and/or service. The data feed update 705 may further include a description 715, such as a synopsis of a longer article, a low-resolution image, an abridged audio and/or video clip, and/or the like. The data feed update may further include a link 720. In one implementation, the link 720 is selectable and may be selected to provide further information, text and/or multimedia content, services, discounts and/or coupons, and/or the like information associated with the data feed update and/or data feed source.

Distributor Controller

Figure 8:
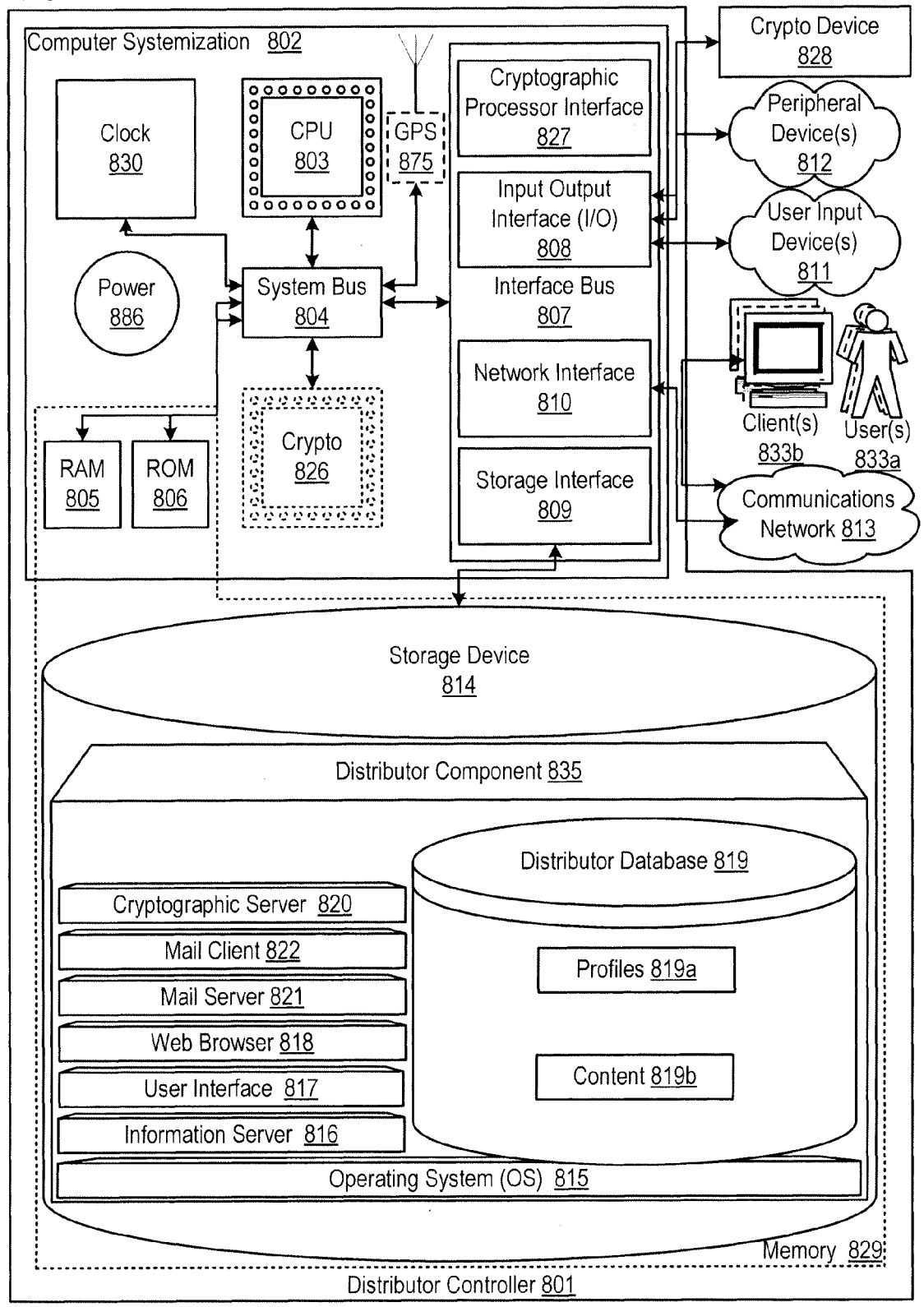
FIG. 8 is of a block diagram illustrating an exemplary embodiment of a Manager controller.

FIG. 8 of the present disclosure illustrates inventive aspects of a Distributor controller 801 in a block diagram.

Typically, users, which may be people and/or other systems, engage information technology systems (e.g., commonly computers) to facilitate information processing. In turn, computers employ processors to process information; such processors are often referred to as central processing units (CPUs). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the Distributor controller 801 may be connected to and/or communicate with entities such as, but not limited to: one or more users from user input devices 811; peripheral devices 812; a cryptographic processor device 828; and/or a communications network 813.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Distributor controller 801 may be based on common computer systems that may comprise, but are not limited to, components such as: a computer systemization 802 connected to memory 829.

Computer Systemization

A computer systemization 802 may comprise a clock 830, central processing unit (CPU) 803, a read only memory (ROM) 806, a random access memory (RAM) 805, and/or an interface bus 807, and most frequently, although not necessarily, the foregoing are interconnected and/or communicating through a system bus 804. Optionally, the computer systemization may be connected to an internal power source 886. Optionally, a cryptographic processor 826 and/or a global positioning system (GPS) component 875 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the Distributor controller and beyond through various interfaces. Should processing requirements dictate a greater amount of speed, parallel, mainframe and/or super-computer architectures may similarly be employed. Alternatively, should deployment requirements dictate greater portability, smaller Personal Digital Assistants (PDAs) may be employed.

Power Source

The power source 886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 886 is connected to at least one of the interconnected subsequent components of the Distributor thereby providing an electric current to subsequent components. In one example, the power source 886 is connected to the system bus component 804. In an alternative embodiment, an outside power source 886 is provided through a connection across the I/O 808 interface. For example, a USB and/or IEEE 1394 connection carries both data and power across the connection and is therefore a suitable source of power.

Interface Adapters

Interface bus(es) 807 may accept, connect, and/or communicate to a number of interface adapters, conventionally although not necessarily in the form of adapter cards, such as, but not limited to: input output interfaces (I/O) 808, storage interfaces 809, network interfaces 810, and/or the like. Optionally, cryptographic processor interfaces 827 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 809 may accept, communicate, and/or connect to a number of storage devices such as, but not limited to: storage devices 814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 810 may accept, communicate, and/or connect to a communications network 813. Through a communications network 813, the Distributor controller is accessible through remote clients 833*b* (e.g., computers with web browsers) by users 833*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 810 may be used to engage with various communications network types 813. For example, multiple network interfaces may be employed to allow for the communication over broadcast, multicast, and/or unicast networks.

Input Output interfaces (I/O) 808 may accept, communicate, and/or connect to user input devices 811, peripheral devices 812, cryptographic processor devices 828, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 811 may be card readers, dongles, finger print readers, gloves, graphics tablets, joysticks, keyboards, mouse (mice), remote controls, retina readers, trackballs, trackpads, and/or the like.

Peripheral devices 812 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the Distributor controller may be embodied as an embedded, dedicated, and/or monitor-less (i.e., headless) device, wherein access would be provided over a network interface connection.

Cryptographic units such as, but not limited to, microcontrollers, processors 826, interfaces 827, and/or devices 828 may be attached, and/or communicate with the Distributor controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allow for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 829. However, memory is a fungible technology and resource; thus, any number of memory embodiments may be employed in lieu of or in concert with one another. It is to be understood that the Distributor controller and/or a computer systemization may employ various forms of memory 829. For example, a computer systemization may be configured wherein the functionality of on-chip CPU memory (e.g., registers), RAM, ROM, and any other storage devices are provided by a paper punch tape or paper punch card mechanism; of course, such an embodiment would result in an extremely slow rate of operation. In a typical configuration, memory 829 will include ROM 806, RAM 805, and a storage device 814. A storage device 814 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 829 may contain a collection of program and/or database components and/or data such as, but not limited to: operating system component(s) 815 (operating system); information server component(s) 816 (information server); user interface component(s) 817 (user interface); Web browser component(s) 818 (Web browser); database(s) 819; mail server component(s) 821; mail client component(s) 822; cryptographic server component(s) 820 (cryptographic server); the Distributor component(s) 835; and/or the like (i.e., collectively a component collection). These components may be stored and accessed from the storage devices and/or from storage devices accessible through an interface bus. Although non-conventional program components such as those in the component collection, typically, are stored in a local storage device 814, they may also be loaded and/or stored in memory such as: peripheral devices, RAM, remote storage facilities through a communications network, ROM, various forms of memory, and/or the like.

Operating System

The operating system component 815 is an executable program component facilitating the operation of the Distributor controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Distributor controller to communicate with other entities through a communications network 813. Various communication protocols may be used by the Distributor controller as a subcarrier transport mechanism for interaction, such as, but not limited to: multicast, TCP/IP, UDP, unicast, and/or the like.

Information Server

An information server component 816 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre-Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Distributor controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Distributor database 819, operating systems, other program components, user interfaces, Web browsers, and/or the like.

Access to the Distributor database may be achieved through a number of database bridge mechanisms such as through scripting languages as enumerated below (e.g., CGI) and through inter-application communication channels as enumerated below (e.g., COBRA, WebObjects, etc.). Any data requests through a Web browser are parsed through the bridge mechanism into appropriate grammars as required by the Distributor. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Distributor as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/Vista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 817 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact with, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 818 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the Distributor enabled nodes. The combined application may be nugatory on systems employing standard Web browsers.

Mail Server

A mail server component 821 is a stored program component that is executed by a CPU 803. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Distributor.

Access to the Distributor mail may be achieved through a number of APIs offered by the individual Web server components and/or the operating system. Also, a mail server may contain, communicate, generate, obtain, and/or provide program component, system, user, and/or data communications, requests, information, and/or responses.

Mail Client

A mail client component 822 is a stored program component that is executed by a CPU 803. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 820 is a stored program component that is executed by a CPU 803, cryptographic processor 826, cryptographic processor interface 827, cryptographic processor device 828, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Distributor may encrypt incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the Distributor component to engage in secure transactions if so desired. The cryptographic component facilitates the secure accessing of resources on the Distributor and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Distributor Database

The Distributor database component 819 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Distributor database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data, but may have other types of functionality encapsulated within a given object. If the Distributor database is implemented as a data-structure, the use of the Distributor database 819 may be integrated into another component such as the Distributor component 835. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 819 includes several tables 819a-b. A Profiles table 819a may include fields such as, but not limited to: user_ID, password, user_name, contact_info, hardware_ID, mobile_device_type, data_feed_subscriptions, address_designations, alerting_restrictions, payment_info, usage_history, and/or the like. A Content table 819b may include fields such as, but not limited to: content_ID, data_feed_source, data_feed_format, title, description, multimedia_content, link, address_designation, hardware_requirements, user_ID, and/or the like. These tables may support and/or track multiple entity accounts on the Distributor controller.

In one embodiment, the Distributor database may interact with other database systems. For example, employing a distributed database system, queries and data access by search Distributor component may treat the combination of the Distributor database, an integrated data security layer database as a single database entity.

In one embodiment, user programs may contain various user interface primitives, which may serve to update the Distributor. Also, various accounts may require custom database tables depending upon the environments and the types of clients the Distributor may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 819a-b. The Distributor may be configured to keep track of various settings, inputs, and parameters via database controllers. The Distributor database may communicate to and/or with other components in a component collection, including itself, and/or facilities of the like. Most frequently, the Distributor database communicates with the Distributor component, other program components, and/or the like. The database may contain, retain, and provide information regarding other nodes and data.

The Distributor Component

The Distributor component 835 is a stored program component that is executed by a CPU. In one embodiment, the Distributor component incorporates any and/or all combinations of the aspects of the Distributor that was discussed in the previous figures. As such, the Distributor affects accessing, obtaining and the provision of information, services, transactions, and/or the like across various communications networks.

The Distributor component is configurable to access, calculate, engage, exchange, generate, identify, instruct, match, process, search, serve, store, and/or facilitate user data feed subscriptions, acquisition and/or updating of data feeds and/or data feed content, communications between and among content providers, MMSCs, users, and/or other Distributor components, enforcement of alerting restrictions, levying of messaging fees, and/or the like and use of the Distributor.

The Distributor component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, WebObjects, and/or the like. In one embodiment, the Distributor server employs a cryptographic server to encrypt and decrypt communications. The Distributor component may communicate to and/or with other components in a component collection, including itself, and/or facilities of the like. Most frequently, the Distributor component communicates with the Distributor database, operating systems, other program components, and/or the like. The Distributor may contain, communicate, generate, obtain, and/or provide program component, system, user, and/or data communications, requests, and/or responses.

Distributed Distributors

The structure and/or operation of any of the Distributor node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. Program component instances and controllers working in concert may do so through standard data processing communication techniques.

The configuration of the Distributor controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method, comprising:
receiving a user data feed subscription request from a user, including at least one data feed address designation, an alert cap, and an additional alert restriction, wherein the alert cap comprises a maximum frequency of mobile device messages sent to a user mobile device in a pre-designated time period and the additional alert restriction comprises a blackout period;

storing the user data feed subscription request in association with the user;

querying a content provider associated with the data feed address designation to retrieve at least one content provider data update;

enumerating a total number of past mobile device messages previously sent to the user mobile device in a pre-designated period of time;

comparing the total number of past mobile device messages previously sent to the user mobile device in the pre-designated period of time to the alert cap;

querying a temporal state;

determining if the temporal state is within the blackout period; and providing the at least one content provider data update to be sent as a mobile device message to the user mobile device when the total number of mobile past device messages previously sent to the user mobile device in a pre-designated period of time does not exceed the alert cap and the temporal state is not within the blackout period.

2. The method of claim 1, wherein querying a content provider and providing the at least one content provider data update are performed periodically.

3. The method of claim 1, further comprising:
validating the user data feed subscription request; and
wherein storing the user data feed subscription request, querying a content provider, and providing the at least one content provider data update only occur if the user data feed subscription request is successfully validated.

4. The method of claim 3, wherein the validating the user data feed subscription request further comprises:
determining if the at least one data feed address designation identifies a valid data feed.

5. The method of claim 1, wherein the at least one data feed address designation comprises a universal resource locator.

6. The method of claim 1, wherein the at least one data feed address designation corresponds to an RSS feed.

7. The method of claim 1, wherein the at least one data feed address designation corresponds to an Atom feed.

8. The method of claim 1, wherein the mobile device message comprises a short message service text message.

9. The method of claim 1, wherein the mobile device message comprises a multimedia messaging service message.

10. The method of claim 1, wherein the mobile device message comprises a title, a description, and a link associated with the content provider data update.

11. The method of claim 1, further comprising: configuring the at least one content provider data update as a mobile device message.

12. The method of claim 1, wherein the receiving a user data feed subscription request further comprises:
providing a web form for display to the user; and
receiving the user data feed subscription request via a web form element.

13. The method of claim 12, wherein the web form element comprises a text box and the user data feed subscription request comprises a universal resource locator typed into the text box.

14. The method of claim 12, wherein the web form element comprises a selectable link and the user data feed subscription request comprises selection of the selectable link.

15. The method of claim 1, further comprising: levying a fee for providing the at least one content provider data update as a mobile device message to a user mobile device.

16. The method of claim 1, wherein the user data feed subscription request comprises a plurality of blackout periods.

17. The method of claim 16, wherein each of the plurality of blackout periods comprises periods of time during which no data feed updates should be sent to the user's mobile device.

18. A system, comprising:
a processor;
a memory in communication with the processor and containing program instructions;
an input and output in communication with the processor and memory comprising a graphical interface;
wherein the processor executes program instructions contained in the memory and the program instructions comprise:
receive a user data feed subscription request from a user, including at least one data feed address designation, an alert cap, and an additional alert restriction, wherein the alert cap comprises a maximum frequency of mobile device messages sent to a user mobile device in a pre-designated time period and the additional alert restriction comprises a blackout period;
store the user data feed subscription request in association with the user;
query a content provider associated with the data feed address designation to retrieve at least one content provider data update;
enumerate a total number of past mobile device messages previously sent to the user mobile device in a pre-designated period of time;
compare the total number of past mobile device messages previously sent to the user mobile device in the pre-designated period of time to the alert cap;
query a temporal state;
determine if the temporal state is within the blackout period; and
provide the at least one content provider data update to be sent as a mobile device message to the user mobile device when the total number of mobile past device messages previously sent to the user mobile device in a pre-designated period of time does not exceed the alert cap and the temporal state is not within the blackout period.

19. A non-transitory computer-readable storage medium storing processor-readable instructions to:
receive a user data feed subscription request from a user, including at least one data feed address designation, an alert cap, and an additional alert restriction, wherein the alert cap comprises a maximum frequency of mobile device messages sent to a user mobile device in a pre-designated time period and the additional alert restriction comprises a blackout period;
store the user data feed subscription request in association with the user;
query a content provider associated with the data feed address designation to retrieve at least one content provider data update;
enumerate a total number of past mobile device messages previously sent to the user mobile device in a pre-designated period of time;
compare the total number of past mobile device messages previously sent to the user mobile device in the pre-designated period of time to the alert cap;

query a temporal state;
determine if the temporal state is within the blackout period; and
provide the at least one content provider data update to be sent as a mobile device message to the user mobile device when the total number of mobile past device messages previously sent to the user mobile device in a pre-designated period of time does not exceed the alert cap and the temporal state is not within the blackout period.

* * * * *